Patented Feb. 14, 1933

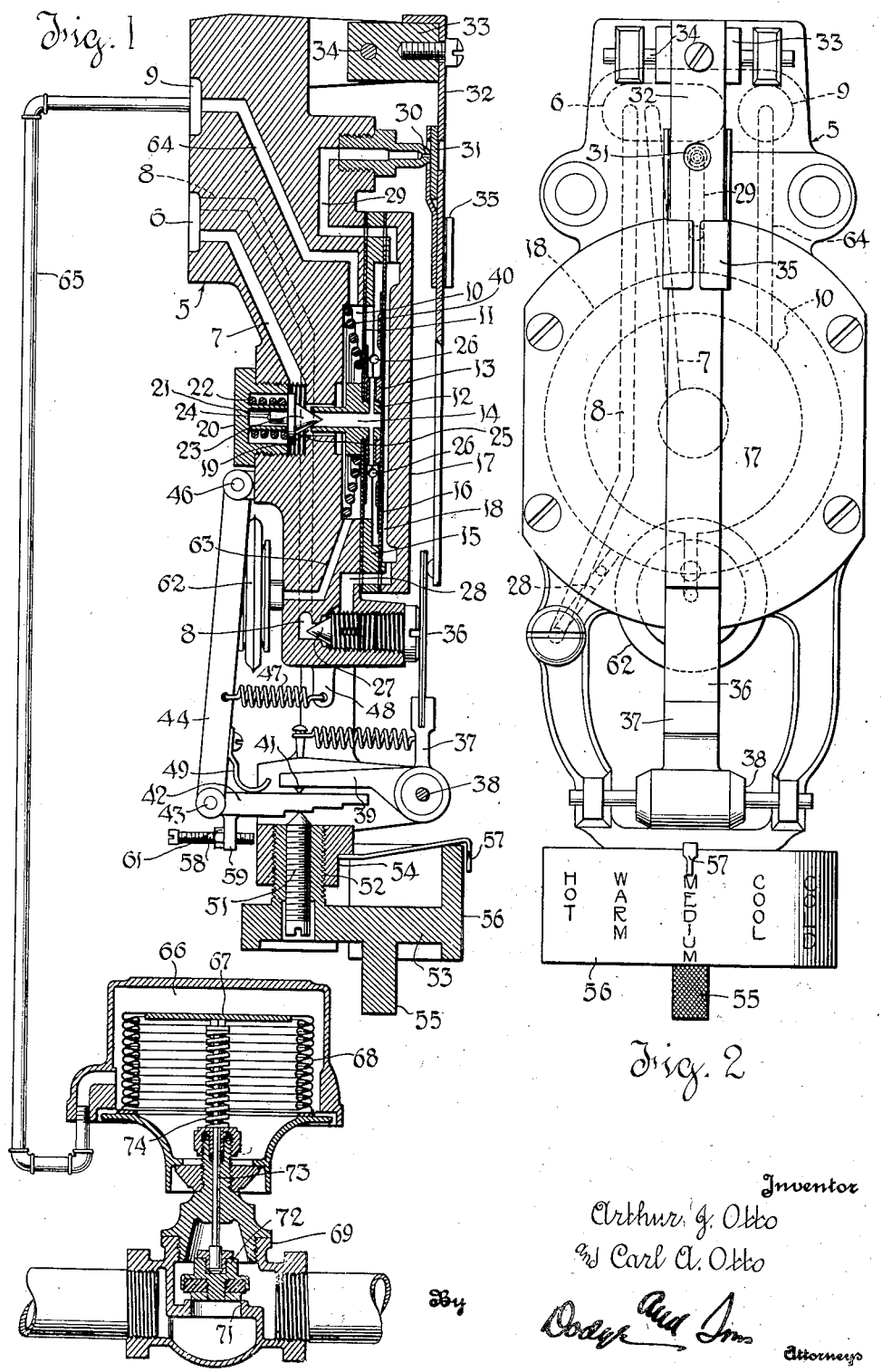

1,897,857

UNITED STATES PATENT OFFICE

ARTHUR J. OTTO AND CARL A. OTTO, OF MILWAUKEE, WISCONSIN, ASSIGNORS TO JOHNSON SERVICE COMPANY, OF MILWAUKEE, WISCONSIN, A CORPORATION OF WISCONSIN

THERMOSTAT AND SIMILAR DEVICE

Application filed June 16, 1930. Serial No. 461,447.

This invention relates to the control of temperature and will be described as applied to a progressive or "intermediate" thermostat of the type disclosed in Patent No. 1,500,260 granted to Otto and Otto, July 8, 1924.

The object of the invention is to modify the relation of the response of the relay motor to the actual motion of the thermostatic member in such a way as to secure special motor response to the indications of a normally sensitive member. The invention may be used to exaggerate or diminish the response in particular ranges, and to secure other special effects, according to the design of a particular cam forming part of the device, as will be explained in detail hereafter.

The preferred embodiment of the invention as applied to a thermostat is illustrated in the accompanying drawing, in which:—

Fig. 1 is a vertical section of a single thermostat with controlled motor. In this figure the porting is diagrammatic.

Fig. 2 is a front elevation of the thermostat shown in Fig. 1. The true position of the ports is indicated in dotted lines in this figure.

The body of the device is illustrated at 5 and is intended to be mounted on the usual pipe head, not shown, by which the usual connections to the supply and control piping are made. Pressure fluid is supplied from the pipe head to the recess 6 and from this recess flows through the ports 7 and 8. A second recess 9 is connected by the pipe head and its connected piping with the damper or valve motor to be controlled, as will be further explained.

Formed in the front face of the body 5 is a recess or chamber 10 whose forward side is covered by a diaphragm 11. The diaphragm 11 is apertured at its center to receive a fitting 12 which is held by a nut 13 threaded thereon, and which is provided with an axial aperture 14, which branches and opens into the space forward of the diaphragm 11.

This diaphragm is held in place by a metal clamping ring 15 which, in turn, supports a second diaphragm 16. The diaphragm 16 is essentially the same as the diaphragm 11, except that it is larger, the ring 15 being shouldered, as shown, to increase the effective area of the diaphragm 16 relatively to the diaphragm 11.

The diaphragm 16 is clamped in place by a cover plate 17, having an annular flange on its inner side to afford a chamber 18. The diaphragm 16 is in thrust relation with, but is not connected to, the member 12, carried by the diaphragm 11. A spring 40 resists inward motion of the two diaphragms.

The port 7 leads to a chamber 19 into which is threaded, from the back of the body 5, a plug 20. This plug 20 is formed with an annular spring seat 21, for a spring 22, and the spring 22 tends to close a conical valve 23 which is guided in the plug 20 by means of a stem 24. The valve 23 seats at 25 in a passage leading from the chamber 19 to the chamber 10. It is axially aligned with the member 12 carried by the diaphragm 11 and when the diaphragm 11 is forced to the left, the valve 23 first closes the axial port 14 in the member 12, and is then forced from its seat 25.

The space between the diaphragms 11 and 16 is vented to atmosphere by means of the ports 26, so that when the diaphragm 11 moves inward (i. e. to the left relatively to Fig. 1) it first closes an exhaust through port 14 and its branches and then unseats the valve 23 to admit pressure fluid entering through the port 7. The reverse movement first seats the valve 23 to cut off the supply and then opens the exhaust through the port 14 and its branches.

The second pressure supply port 8 leads to an adjustable needle valve 27 of conventional form. From the needle valve 27 a restricted flow is by way of a port 28 to the chamber 18 in front of the forward diaphragm 16. The port 28 is formed in the body 5, ring 15, and cover 17. From the chamber 18 a port 29 leads to a leak port 30 whose capacity is greater than the adjusted capacity past the needle valve 27.

The leak port 30 is controlled by a celluloid valve member 31. The valve member 31 is mounted on an arm 32 fixed on a weight 33. The weight 33 is pivoted at 34. The weight 33 urges the arm 32 inward to cause valve 31 to seal against the end of the nipple in which leak port 30 is formed. The valve 31 is held in a clip 35.

The temperature-responsive element, which is here illustrated as a bi-metallic thermostatic bar 36, is mounted in the upstanding arm 37 of a bell crank which is pivoted at 38 and has a horizontal arm 39. The arm 39 carries a boss or contact point 41 which rests on the upper side of a cam bar 42, which is the modifying cam above mentioned.

The cam 42 is pivoted at 43 to the lower end of a lever 44. The lever 44 is fulcrumed at its upper end, the fulcrum being indicated at 46 and being supported on the body 5 of the thermostat. The tension spring 47 draws lever 44 forward, that is, to the right with reference to Fig. 1. The spring 47 is connected to a lug 48 on the body 5.

The cam member 42 is urged downward around the pivot 43 by means of a bow spring 49 fixed on the lever 44. Its downward motion is limited by a cone-pointed screw 51, which is threaded into the hub 52 of the adjusting member 53. The hub 52 is in turn threaded into a boss 54 forming part of the body 5.

The adjusting member 53 includes a handle member 55 and an arcuate cylindrical dial 56 which carries index markings, as clearly shown in Fig. 2. The index markings are read against an index or pointer 57 carried on the boss 54.

The pointer 57 is also constructed to serve as a spring detent which frictionally engages the upper portion of the dial 56. The user adjusts the instrument by grasping the handle 55 and swinging the dial. This screws the hub up and down through the boss 54. The screw 51 is quite closely fitted so that it is retained by friction and is turned only to initially adjust the instrument so that the dial will read correctly.

Motion of the lever 44 forward, that is, to the right in Fig. 1, is limited by a stop screw 58 threaded in a boss 59 on the cam member 42. It is locked in adjusted position by check nut 61. The lever 44 is urged rearwardly, that is, to the left in Fig. 1, by the diaphragm motor 62, which communicates through a passage 63 with the chamber 10. The chamber 10 is connected by the passage 64 and pipe 65 with a working space 66 of the motor which actuates the device to be controlled by the thermostat. Merely as an example of such a device, there is shown a steam heating valve.

The movable member of the motor includes an abutment 67 with metallic bellows 68. The body of the steam valve is indicated at 69, the valve seat at 71, the valve at 72 and the valve stem at 73. In the example illustrated, the valve stem 73 is urged in an opening direction by a coil spring 74 which is overpowered by the abutment 67 when pressure fluid is admitted to the motor by the operation of the thermostat.

It is apparent, therefore, that the pressure which acts in the motor 62 is the same as the pressure which acts in the motor 66, and the function of the thermostat is to vary this pressure between certain chosen limits to close and open the valve 72. It is understood, of course, that any device might be substituted for the valve 72. For example, it is common in the heating art to control dampers by motors. It will be observed that as the pressure in the motors 62 and 66 rises the valve 72 will move progressively in a closing direction, and the lever 44 will be swung progressively in an inward direction (to the left with reference to Fig. 1). The effect is to shift the cam 42. The cam 42 is designed to present a varying thickness between the point of the screw 51 and the contact point 41 on the arm 39. In the example illustrated, a plurality of steps are shown so arranged that as the pressure rises the thermostatic bar 36 is swung inward tending to close the leak port 30. This arrangement is not essential, however, for the cam member 42 may be variously designed and, for special purposes and within reasonable limits, may impart any desired characteristic of adjusting motion to the thermostat 36.

*Operation*

The normal function of the thermostatic bar 36 is to shift the valve member 31 minutely in opening and closing directions, thus variably throttling the leak port 30 so that its discharge capacity varies relatively to the rate of flow past the valve 27. Closing of the valve 31 consequently produces a pressure increase in the chamber 18, while opening causes a pressure decrease.

An increase of pressure tends to shift the double diaphragm structure to the left, shutting off the exhaust through the port 14, and opening the supply from the port 7 past valve 23 to the chamber 10. When the pressure in the chamber 18 falls the tendency is to close the supply and open the exhaust in the chamber 10. Consequently, since the effective area of the diaphragm 11 is less than the effective area of the diaphragm 16, the pressure in the chamber 10 varies as the pressure in the chamber 18 varies, but is higher.

Broadly stated, therefore, the function of the thermostatic bar 36 is to produce pressure variations in the chamber 10. So far the operation is that of the thermostat described and claimed in the prior patent above identified. The present invention contemplates the use of a motor 62 which responds to the pressure created in the chamber 10 and effects a secondary adjustment of the thermostatic bar 36. The effect of this, according to the design of the cam 42, is to intensify or to partially neutralize the thermal response to the bar 36. In fact, the cam 42 may be so designed as to modify the ultimate effect of the bar 36 in different ways at different portions of its operative range.

While the mechanical apparatus just described has many fields of use, the embodiment shown in the drawing and including the stepped cam, was designed to meet particular conditions which will be described.

In any heating plant of the type which merely draws in outdoor air and heats it, without humidifying it, the heated air will have a very low relative humidity whenever outside temperatures are low because of the low absolute humidity then existing out of doors. As low relative humidity entails the use of a slightly higher room temperature to give the same sense of comfort it is desirable to heat rooms to such higher temperature whenever low temperatures prevail outside. The present invention provides means to this end.

As an example of desirable practice assume that when outdoor temperature is zero, the indoor temperature is to be maintained at 72° F. to counteract low indoor relative humidity. When the outdoor temperature is high, say of the order of 65°, the indoor temperature will be maintained at about 68°, because at such time the relative humidity indoors will be nearly normal. When the outdoor temperature has an intermediate value, say 35° to 40°, the indoor temperature will be maintained at say 70° to correspond to the intermediate condition of indoor relative humidity which will then exist.

While various values might be used for the supply air pressure to recess 6 we will assume an ordinary system operating at ten pounds per square inch gage. With outdoor temperature around 60° valve 72 will be nearly closed, and pipe 65 and diaphragm motor 62 would be under a pressure approximating ten pounds per square inch and above seven and a half pounds per square inch. When outdoor temperature is very low, the valve 72 will be wide open most of the time, and pipe 65 and diaphragm motor 62 will be under little or no pressure, certainly less than five pounds per square inch. With medium outdoor temperatures the pressure in the parts 65 and 62 would be between five and seven and a half pounds.

The cam 42 is thus formed with three steps. The thickest portion of the cam is presented between the parts 41 and 51 for pressures between zero and five pounds per square inch. The next step is presented for pressures between five and seven and a half pounds per square inch, and the third or thinnest of the three stepped portions is presented for pressures between seven and a half to ten pounds. The steps are so designed that they produce adjustments of the thermostatic bar differing by 2° F.

It follows that in the low outdoor temperature range the thermostat will function to maintain a temperature indoors of 72°. In the high outdoor temperature range it will function to maintain an indoor temperature of 68°, and in the intermediate range will maintain an indoor temperature of 70°. The temperature values may be differently chosen according to the preferences of the designer.

If it is not desired to maintain three fixed temperatures in three different ranges, the cam, can, of course, be designed to give progressive adjustment.

One feature of the invention is the recognition of the fact that the pressure in the motor which operates the heat regulating valve is a function of outside temperature. This variation in pressure is applied to produce corresponding adjustments of the thermostatic bar which itself responds solely to inside temperature.

What is claimed is:

1. The combination of an element responsive to temperature; a heat regulating motor controlled thereby; means for adjusting said responsive element; and automatic means for shifting said adjusting means in such determined relation to the response of said motor, that in the heat-on position of said motor the thermostat is set to maintain a higher temperature than in the heat-off position of said motor.

2. The combination of an element responsive to temperature; a pressure regulating valve mechanism controlled thereby; adjusting means for adjusting said element; and a pressure motor connected to actuate said adjusting means and subject to the pressure established by said regulating valve mechanism.

3. The combination of an element responsive to temperature; a pressure regulating valve mechanism controlled thereby; adjusting means including a cam for adjusting said element; and a pressure motor connected to actuate said cam and subject to the pressure established by said regulating valve mechanism.

4. The combination of an element responsive to temperature; a pressure regulating valve mechanism controlled thereby; adjusting means including a stepped cam for adjusting said element; and a pressure motor connected to actuate said cam and subject to the pressure established by said regulating valve mechanism.

5. The combination of a pressure controlling device including a leak port and a valve for variably throttling said leak port; a member responsive to temperature arranged to actuate said valve; means for adjusting said member to modify the action of said valve; and means subject to pressure controlled by said device and connected to actuate said adjusting means.

6. A control device comprising in combination a chamber having a movable wall and provided with a pressure fluid supply and an exhaust passage of somewhat greater capacity than said supply; a valve member movable to throttle in variable degree said exhaust port; an element responsive to temperature for actuating said valve; means for adjusting said responsive element; a second chamber; a pressure regulating means actuated at least in part by the movable wall of said first chamber and serving to establish in the second chamber a pressure which varies in direct relation to the pressure in the first chamber; a motor subject to the pressure in said second chamber; and operative connections between said motor and said adjusting means.

7. A control device comprising in combination a chamber having a movable wall and provided with a pressure fluid supply and an exhaust passage of somewhat greater capacity than said supply; a valve member movable to throttle in variable degree said exhaust port; an element responsive to temperature for actuating said valve; means for adjusting said responsive element; a second chamber; a pressure regulating means actuated at least in part by the movable wall of said first chamber and serving to establish in the second chamber a pressure which varies in direct relation to the pressure in the first chamber; a motor subject to the pressure in said second chamber; and operative connections including an irregular cam interposed between said motor and said adjusting means.

8. A control device comprising in combination, a body having a chamber, a pressure fluid inlet-port leading thereto, and a port for connecting said chamber with a device to be controlled; a movable wall closing one side of said chamber and formed with an exhaust port leading through said wall to atmosphere; a valve controlling said supply port, spring urged in its closing direction, and arranged to be engaged by said movable wall and when so engaged to close said exhaust port and upon further movement of said wall to open said supply port; a second chamber having a movable wall larger than and in operative relation with the movable wall of the first chamber; a valve mechanism for controlling the pressure in the second chamber; a thermally responsive element for actuating said valve mechanism; means for adjusting said responsive element; and motor means subject to the pressure in the first chamber for shifting said adjusting means.

9. A control device comprising in combination a body having a chamber; a pressure fluid inlet-port leading thereto, and a port for connecting said chamber with a device to be controlled; a movable wall closing one side of said chamber and formed with an exhaust port leading through said wall to atmosphere; a valve controlling said supply port, spring urged in its closing direction, and arranged to be engaged by said movable wall and when so engaged to close said exhaust port and upon further movement of said wall to open said supply port; a second chamber having a movable wall larger than and in operative relation with the movable wall of the first chamber; a valve mechanism for controlling the pressure in the second chamber; a thermally responsive element for actuating said valve mechanism; means for adjusting said responsive element; a motor subject to pressure in the first chamber; and an operating connection including an irregular cam between said motor and said adjusting means.

10. The combination of a thermostatic element; adjustable heat supplying means controlled thereby to vary the rate of heat supply; means for adjusting said thermostatic element; and automatic means operatively related to said heat supplying means and connected to actuate said adjusting means to adjust the thermostatic element to maintain a higher temperature when the heat supplying means is adjusted for high rate of supply.

11. The combination of a pressure actuated means for regulating a supply of heat; a thermally responsive element; a relay pressure controller interposed between said pressure actuated means and said thermally responsive element, and through which the responsive element controls said pressure actuated means; and an adjusting mechanism for the thermal element responsive to pressure established by said pressure controller.

12. The combination of a heat controlling motor; a thermostat connected to control said motor and including an adjustable thermally responsive element; and means operatively connected with said motor and arranged to vary the adjustment of said thermally responsive element to increase the temperature setting thereof as said motor moves in a direction to turn the heat on.

13. The combination of a heat controlling means shiftable between a position in which the flow of heat is maximum, and another position in which the flow of heat is less; a thermostat for actuating said means to cause it to move between said positions;

and means for modifying the adjustment of the thermostat in accordance with the movements of the heat controlling means to maintain a higher temperature when the controlling means is in a maximum flow position.

In testimony whereof we have signed our names to this specification.

ARTHUR J. OTTO.
    CARL A. OTTO.